July 26, 1932. S. BERGSTEIN 1,868,873
MACHINE FOR OPENING CARTONS OR TRAYS
Filed Oct. 28, 1930 5 Sheets-Sheet 1

INVENTOR.
Samuel Bergstein
BY
ATTORNEYS.

July 26, 1932. S. BERGSTEIN 1,868,873
MACHINE FOR OPENING CARTONS OR TRAYS
Filed Oct. 28, 1930 5 Sheets-Sheet 2

INVENTOR.
Samuel Bergstein
BY
ATTORNEYS

INVENTOR.
Samuel Bergstein
BY
ATTORNEYS

July 26, 1932.  S. BERGSTEIN  1,868,873
MACHINE FOR OPENING CARTONS OR TRAYS
Filed Oct. 28, 1930  5 Sheets-Sheet 4

INVENTOR.
Samuel Bergstein
BY
ATTORNEYS

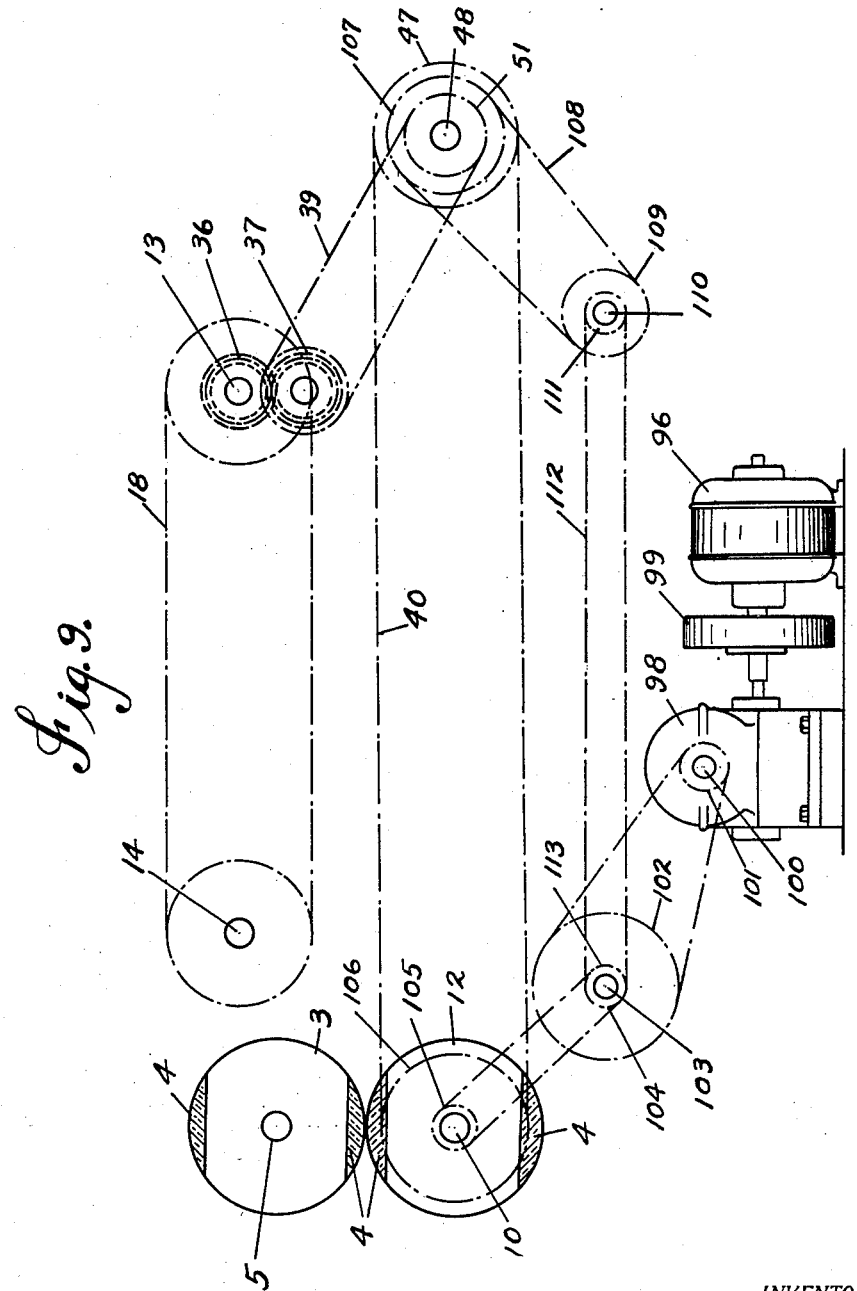

Patented July 26, 1932

1,868,873

UNITED STATES PATENT OFFICE

SAMUEL BERGSTEIN, OF CINCINNATI, OHIO

MACHINE FOR OPENING CARTONS OR TRAYS

Application filed October 28, 1930. Serial No. 491,736.

My invention relates to that type of mechanism used for opening cartons or trays that have been previously formed and folded into knock down condition so as to economize in shipping space.

In my Patent No. 1,784,571, issued December 9, 1930, I have described a machine of the general type, on which the following invention is an improvement because of its simpler construction, adjustability, and greater productive possibilities.

It is an object of my invention to provide a machine which automatically feeds knocked down cartons or trays through the machine and during their feeding movement opens them up and delivers them in an open state, ready to receive the materials intended to be packed in them.

Another object is to provide a machine consisting of a feeding mechanism synchronized with a conveyor to carry the cartons or trays through the machine continuously in time with a secondary conveyor which carries individual paddles to start the opening of the cartons or trays before they reach the end turning mechanism. The end turning mechanism is adapted to turn and refold the ends so that they will remain opened up without stopping the movement through the machine.

A further object is to provide an automatic refolding machine for knock down cartons or trays that is readily adjustable to different sizes of cartons or trays.

Broadly, it is the object of my invention to provide an adjustable automatic machine in which previous formed open topped cartons are placed in a hopper and fed through the machine continuously in sequence, without interruption during the opening up and refolding operation. It is specifically my object to provide a machine in which previously formed cartons are placed in a hopper of the machine in a knocked down condition, and in which the cartons are fed through the machine, during which the sides of the cartons are first spread apart and then the ends are turned and bent inwardly so as to leave the cartons or trays in open condition when they are delivered.

These and other objects which will be more specifically pointed out in the following description, I accomplish by that certain combination of parts of which I have illustrated a preferred embodiment of my invention.

In the drawings:

Figure 9 is a diagrammatic view of the drive for the machine.

Figure 1:
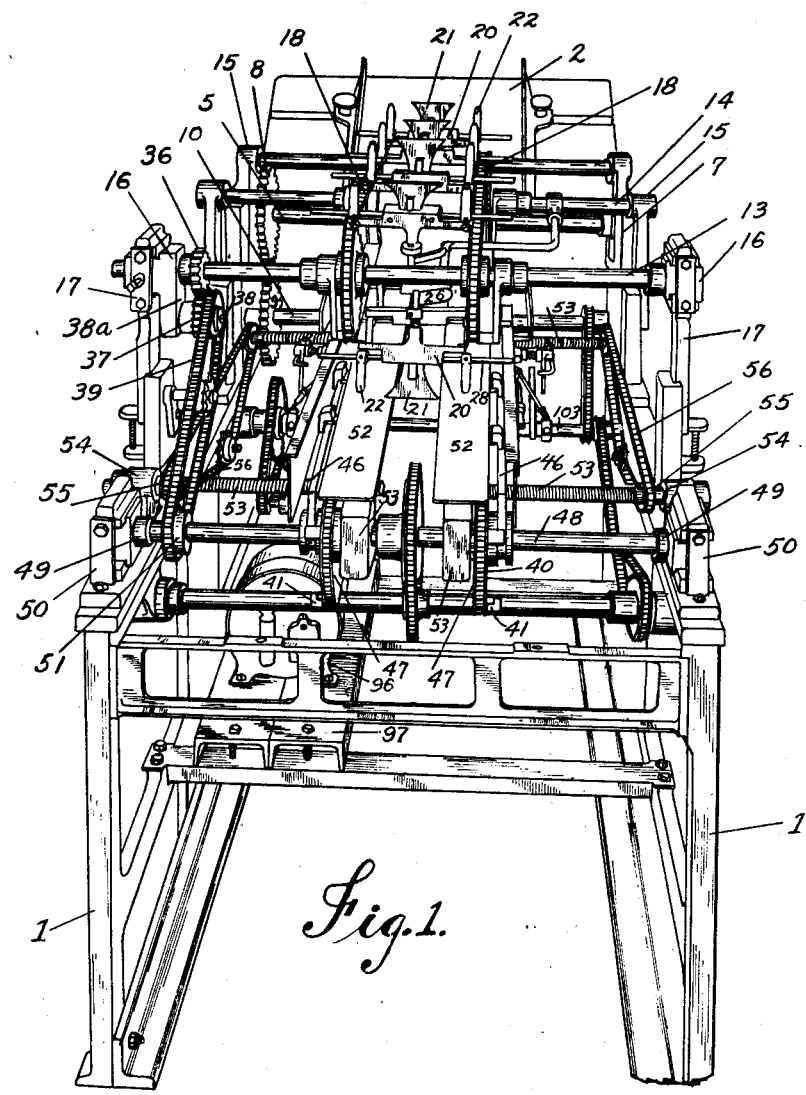
Figure 1 is a perspective taken from the delivery end of the machine.

The entire machine consists of a feeding mechanism, an upper and lower conveyor system, and the opening up and end refolding mechanism, together with the power driving means suitably supported on standards or main frames 1.

The feeding mechanism consists of an adjustable hopper 2 arranged to be adjusted to any desired angle to facilitate the sliding of the cartons or trays towards rotating feed rolls 3. The cartons or trays 3a are retarded and so positioned that only one at a time can be carried into the machine by the feed rolls. This type of feeding mechanism is well known in the art and needs no detailed description except as to the novel arrangement I use to keep it in time with the conveyors of my machine.

The feed rolls have rubber inserts 4 on their periphery which come in contact with the cartons or trays and pull them forwardly into position to come in contact with and be carried along by a conveyor to be described. These rolls are fixed to a shaft 5 rotatable in bearings 6 adjustable in brackets 7 that are fixed to the main frames 1 of my machine. On the shaft 5 there is fixed a gear 8 which drives it. This gear is in mesh with another similar gear 9 on another shaft 10 rotatably mounted in bearings 11 provided in the frames of the machine. On the center of this shaft is fixed another feed roller 12 similar in construction to the feed roller previously described. These two rollers are timed so that the rubber inserts in them will reach the carton or tray at the same time, pick it up, and advance it forward to be engaged by lugs on a conveyor to be described. The shaft 10 is driven by means of a chain, and this shaft drives the upper feed roll shaft by means of the spur gears just described.

On the upper part of my machine I have mounted shafts 13 and 14 rotatable in the bearings 15 and 16. The bearings 16 are adjustable in brackets 17 in order to apply the proper tension on chains 18. On the chains 18, at spaced intervals, I have mounted lugs 19 on which are rigidly mounted connecting bars 20 that support paddles 21 and pressure plungers 22.

Figure 7:
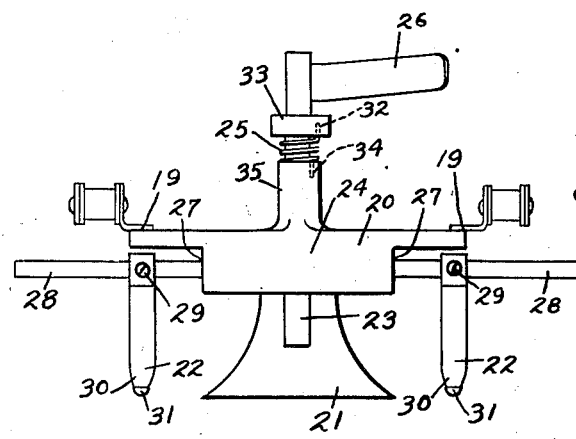
Figure 7 is a detail of one of the revolving blades used on the machine to give the sides of the cartons a preliminary start before refolding the ends of the cartons.
Figure 8:
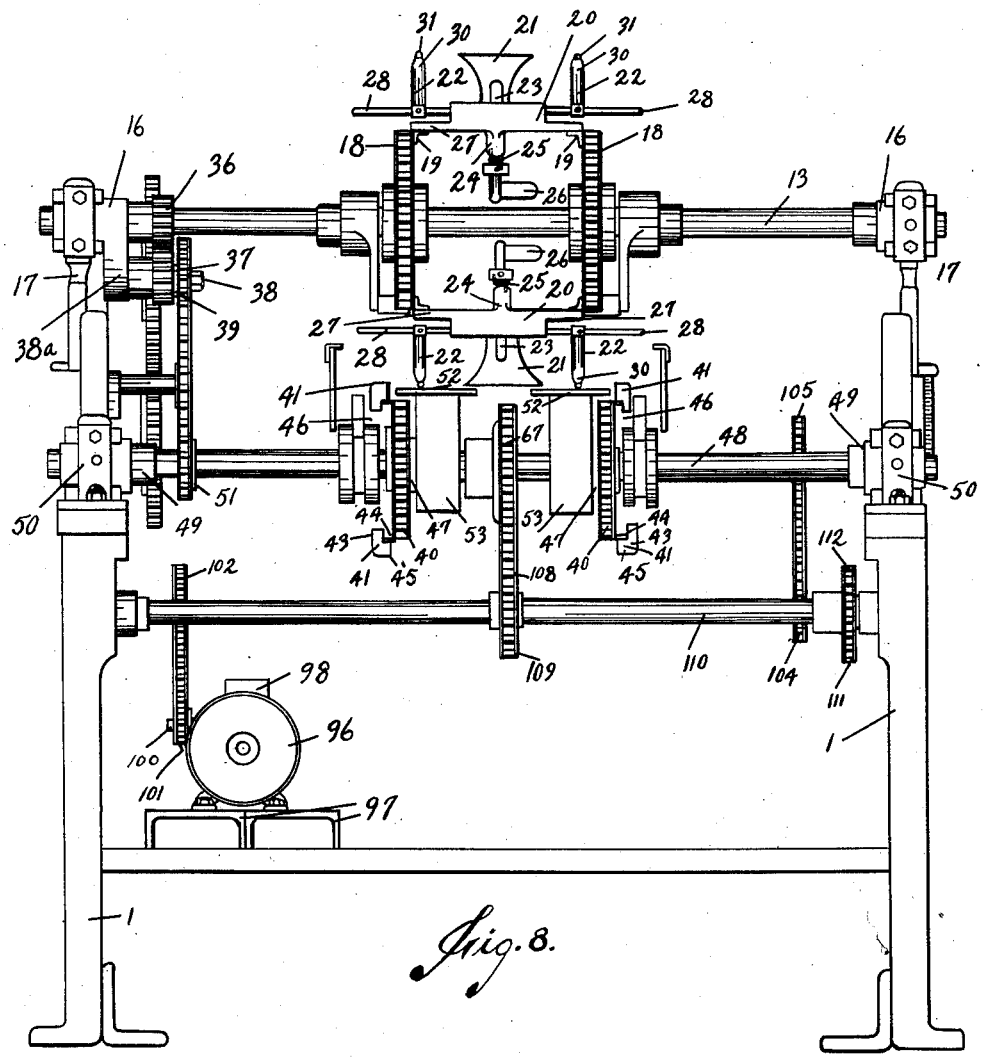
Figure 8 is an end elevation of the machine illustrating in detail the conveyor system with certain parts omitted.

The paddles are rigidly fastened to shafts 23, shown in Figure 7, which are rotatably mounted in bearings 24 provided in the connecting bars. Surrounding the shafts at the upper ends are springs 25 which pull the paddles back to the position shown in Figures 7 and 8, which is the position of the paddles when the levers 26, also fast to the shafts, are out of contact from a cam rail or bar to be subsequently explained. The connecting bars have offset portions 27 with the side walls of the offset drilled to receive and rigidly retain therein bars or rods 28 upon which are adjustably mounted the pressure plungers 22. These plungers are for holding the carton down on plates (to be described later) while the carton or tray is passing through the machine. The plungers are held in a set position by means of set screws 29. The points 30 of the plungers are drilled to receive flexible members 31 such as rubber or the like, which can compress during the time the plungers are in contact with the cartons or the trays while passing over the plates and through the machine. These plungers also prevent the cartons or trays from sliding out of position relative to the paddles while the sides are being turned up. The springs that return the paddles to normal position have one end 32 fast in the bosses 33 which are part of the levers that rotate the paddles and the other ends are fast in the upper ends 34 of the bosses 35 that extend from the connecting bar. Any slight rotation of the shaft puts tension on the spring, which naturally tries to relieve itself of this tension and in doing so, pulls the paddles back to normal position.

Rigidly mounted on the shaft 13 is a pinion 36 which meshes with another pinion 37 that is rotatively mounted on a stud 38 fixed in a suspended bracket 38a. Fixed to the pinion 37 is a sprocket that is driven by means of a chain 39. The chain drives the sprocket, which in turn, drives the two pinions and thereby the shaft which drives the conveyor supporting the paddles and plungers. This conveyor is timed so that the paddles and plungers will come in contact with the cartons or trays as they are fed in by the feed rollers.

Figure 10:
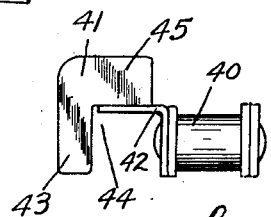
Figure 10 is a detail of a lug attached to a link of the conveyor chain that carries the cartons or trays through the machine.
Figure 2:
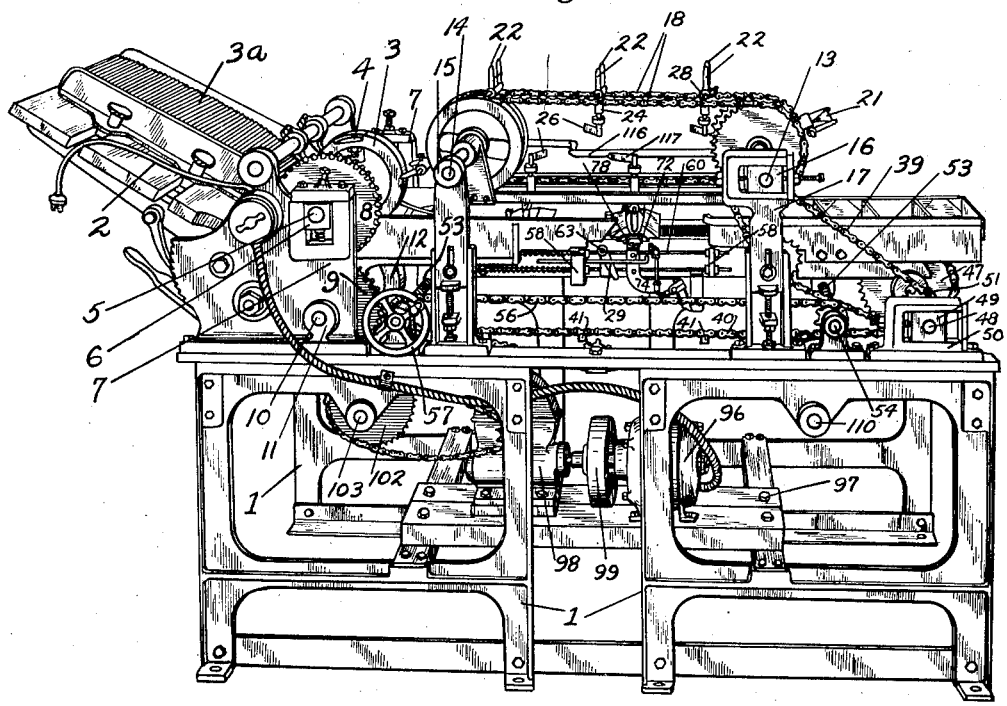
Figure 2 is a perspective taken from the side of the machine.

Another double chain conveyor 40 has lugs 41 attached to it at spaced intervals, and spaced in relation to the paddles and plungers carried on the chain just described. These lugs are placed one half the width of a carton or tray, behind the paddles and plungers so that they may come in contact with the outside edge of a carton or tray as it is fed forward by the feed rollers. Figure 10 shows a detail view of these lugs. These lugs have a leg 42 for fixing them to the conveyor chain, and another leg 43 which engages a trigger to be explained. The open space 44 is provided to permit the passage over the trigger. The upper part 45 of the lug extends up above a guide channel 46 and is the part that engages the carton and carries it through the machine.

The conveyor consists of two chains 40 on each side of the machine, extending around sprockets 47 that are splined to and driven by a shaft 48 rotatably mounted in bearings 49 that are adjustably mounted in brackets 50 fixed to the main frame of the machine. Fixed to this same shaft is another sprocket 51 from which the chain 39 runs to the sprocket attached to the pinion gears previously described, and drives the upper conveyor which carries the paddles and the plungers. Driving these conveyors accordingly enables me to keep them properly timed.

The plates 52 upon which the cartons or trays rest while passing through the machine, extend the full length of the machine and are fixedly supported on blocks 53 that are slidably mounted on the shafts 48 so that they can slide laterally along the shaft when it is necessary to adjust the machine for a wider carton or tray. The shafts 48 are free to rotate in these blocks supporting the plates. Tapped holes are provided in these blocks to receive adjusting screws 53a, the outside ends of which are rotatably mounted in bearings 54 supported on the main frame of the machine. These screws are the means whereby the plates, guides and sprockets with the chain comprising the conveyor, are moved towards or away from each other, according to the adjustment required. There are four of these screws, and on each I have fixed sprockets 55 connected to each other by means of link chains 56 so that if one of the screws is turned, the other will turn with it and cause the plate with its conveyor to move in the desired direction. A hand wheel 57, one on each side of the machine, is fixed to one of the screws and is the means for turning the screws when adjustment is desired.

Figure 6:
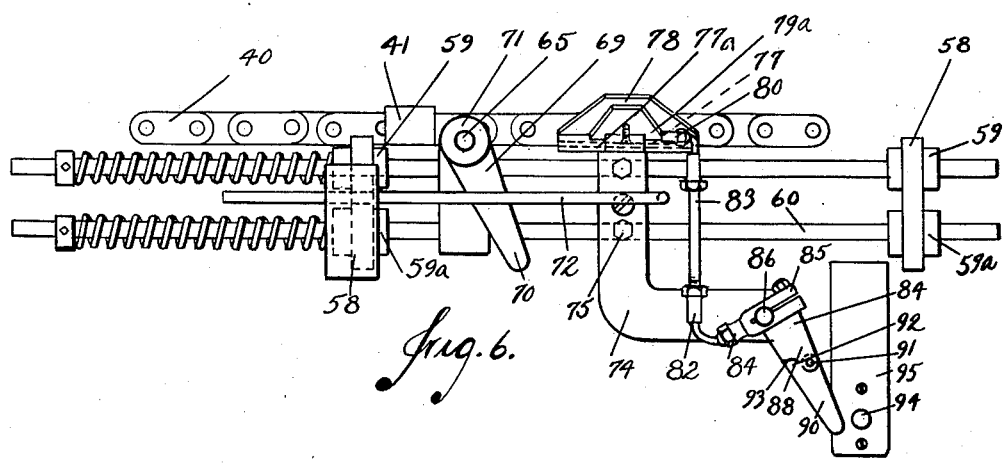
Figure 6 is a side elevation of the mechanism for folding in the ends of the cartons or trays while they are passing through my machine.

Mounted approximately in the center of the machine on each side is the end folding mechanism. It consists of brackets 58 rigidly mounted on the main frames and having bearings 59 and 59a for sliding rods 60. These rods are free to slide in the bearings, as shown in Fig. 6, and returned to the position shown by means of the compression springs 61 retained between the face of the bearing and the collars 62 fixed on the shafts by means of set screws 62a.

Figure 5:
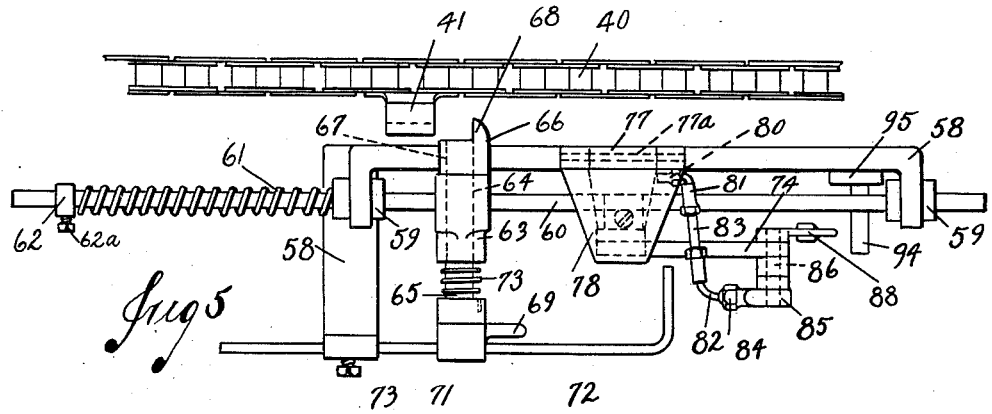
Figure 5 is a top plan view of the mechanism for folding in the ends of the cartons or trays while they are passing through the machine.

A trigger bearing block 63 is adjustably mounted on the rods in order to vary the position of release of the trigger from the lugs on the conveyor which carries the cartons or trays through the machine. A hole 64 is provided in the trigger bearing block for rotatably supporting the shaft 65 that is attached to a trigger 66. This trigger (see Fig. 5) comprises a boss 67 from which a tongue 68 extends and is free to engage the lugs 41 on the chain 40 when it is in the position shown in Figure 5. The notched portion of the trigger is provided to allow the lug to pass by the trigger when the tongue is rotated from the vertical into the horizontal plane. A lever 69 is fixedly mounted on the end of the trigger shaft and its shank 70 extending from the boss 71, is arranged to engage a trip rod 72 that is adjustably mounted in a bearing 73 that is part of the bracket supporting the end turning mechanism. A spring 73a with one end fixed in the boss of the trigger bearing bracket and its other end fixed in the boss of the lever, surrounds the shaft and provides the means for pulling the trigger to the position shown in Figure 6 after the lever is pulled out of engagement with the trip rod.

Another bracket 74 is adjustably mounted on the rods and held in a set position with relation to the rods by means of set screws 75. At the upper end 76 of the bracket I provide a bearing 77 for a hinge pin 77a which rotatively supports member 78 shaped to conform to the score lines 79 on the end of the carton. The member 78 in this case is similar to a trapezoid, but I do not wish to limit myself to that particular shape because any form may be used, depending upon the shape of the carton or tray. Rigidly attached to the underside 79a of the member 78 is a socket 80 of a universal joint 81. This joint is connected to another universal joint 82 by means of an adjusting rod 83. The socket 84 of the other universal joint is rigidly fastened to an arm 85, which in turn is fixed to a stud 86 that is rotatably mounted in the L shaped bracket 74. On the other end of the stud 86 there is fixed a lever 88 that actuates the member 78 through the medium of the universal joints. This lever is divided into an upper half 89 and a lower half 90, which are connected together by a hinged joint 91. This joint is provided to allow the lower half to rotate in a counterclockwise direction while passing back over a trip pin when the end turning mechanism is returned to normal position by means of the springs, and it also provides a rigid bar when the lever is rotated in a clockwise direction because the tooth-like projection 92 on the lower half comes in contact with the notch 93 on the upper half. This lever is so arranged to engage a pin 94 which is fixed in another bracket 95, that is fixed to the main frame of the machine. Engagement between the lever and the pin while the end turning mechanism is moved to the right, will cause the rotation of the shaft, which in turn actuates the universal joints and rotates the member 78 on its pin, and bends in and refolds the ends of the carton so that they will spring back to an upright position. The rotation of the end turning member will be best understood by referring to Figures 5 and 6. The refolding operation breaks the strength of the initial scoring so that the carton will not sag back toward its previously flattened position.

My machine is driven by means of a motor 96 that is supported on a platform 97 rigid on the main frame of the machine. This motor is directly connected to a reduction unit 98 through a clutch 99. Attached to a shaft 100 from the reduction unit, is a sprocket 101 which connects to another sprocket 102 fixed to a jack shaft 103 that is rotatably mounted in bearings provided in the frame of the machine. On this same shaft there is another sprocket 104 which connects to a sprocket 105 on the shaft 10, and drives the feed roll shafts as previously described. The sprockets 106 are rotatably mounted on the shaft 10 and are driven by the chains 40 which also connect to the sprockets 47 that complete the conveyor which carries the cartons or trays through the machine. As has been explained, the sprockets 47 are adjustably keyed to the shaft 48, which is driven by means of a sprocket 107 that is fixed to the shaft 48 at the center. The chain 108 connects the sprocket 107 to another sprocket 109 on a jack shaft 110, rotatably mounted in bearings provided in the frame of the machine. This last shaft is driven by means of a sprocket 111 fixed thereon, and the sprocket is driven by a chain 112 which connects to another sprocket 113, that is fixed on the jack shaft 103. The drive for the upper conveyor has been previously described, and it is thought that with the description and reference to the diagrammatical representation of the drive in Figure 9, it will be clear how all the elements comprising my machine are kept in proper time relationship.

Figure 3:
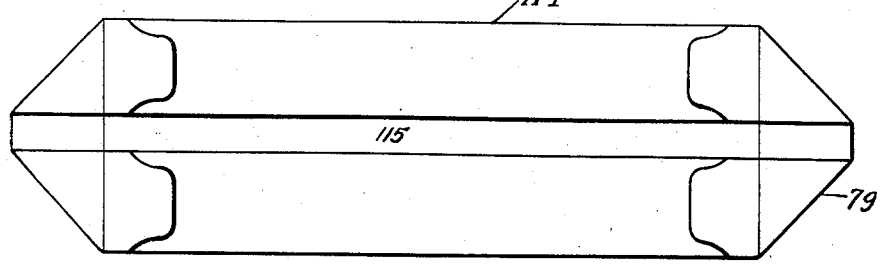
Figure 3 is a top plan view of a typical tray or carton in the knocked down condition before it is fed through the machine.
Figure 4:
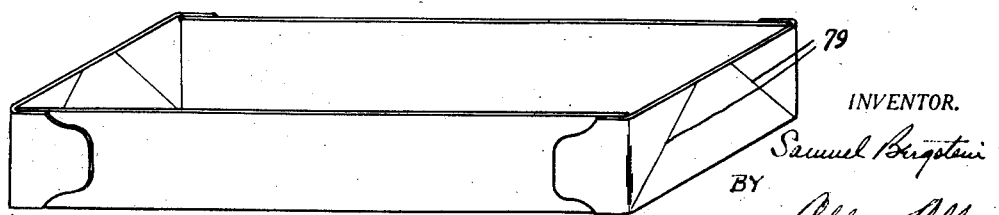
Figure 4 is a perspective view of a carton or tray, and showing the carton after the opening up and refolding operation.

The cartons are placed into the hopper so that they can come into contact with the feed rollers one at a time. The feed rollers push the cartons or trays forward far enough so that the lugs on the lower conveyor will come in contact with an outer edge 114, as shown in Figure 3, and pull the cartons or trays through the machine. At the same time that the lugs come into contact with the edges of the cartons, the paddles and the plungers will also have come into contact with the cartons or trays in the space 115 between the side walls of the cartons. The plungers will hold the cartons or trays down on the plates and prevent them from slipping out of position relative to the paddles. While the conveyor is pulling the cartons or trays through the machine, the levers on the shafts supporting the paddles will come into contact with the cam rod 116 and turn the paddles to the position shown at 117, and thereby start to open up the cartons. This operation is essential in order to prevent buckling or hindrance of turning in and refolding the ends. When the sides have been partially turned up, the lugs pulling the cartons forward will come in contact with the triggers, which pull the rods with the member 78 to the right, as shown in Figure 6. When the lever comes in contact with the pin 94, it will cause the stud 86 to rotate and actuate the member 78, which will push the ends of the cartons or trays up, inward and downward from which position they will spring back to the position of an open carton or tray, as illustrated in Figure 4. After being pulled forward a definite amount, the lever operating the trigger will come in contact with the offset portion 118 of the trip rod and rotate the tongue of the trigger a sufficient amount so that it can slide under the lug and allow the springs to pull the end turning mechanism back to its normal position, where it will be ready to come into contact with the next succeeding lug on the conveyor and repeat its operation.

Having thus described my invention, what I claim as new and desire to secure by Letters Patent, is:—

1. A machine for opening up knock down flatly folded containers, including a conveyor for feeding the containers through the machine, means for partially opening the containers, and means for folding in the ends of the containers during their transit through the machine, said last named means adjustable for various sized containers.

2. A machine for opening up knock down flatly folded containers having opposite carriers operable in unison into coordinated operative relation, one of the carriers effective to advance the containers through the machine, and the other carrier provided with means for partially opening said containers while they are carried on the container advancing carrier, and independent means for inversely folding ends of said containers, said means adjustable for different sized containers.

3. A machine for opening up knock down flatly folded containers having opposite carriers operable in unison into coordinated operative relation, one of the carriers effective to advance the containers through the machine, and the other carrier provided with means for partially opening said containers while they are carried on the container advancing carrier, and independent means for inversely folding ends of said containers, said container advancing carrier adjustable for different sized containers.

4. A machine for opening up knock down flatly folded containers having opposite carriers operable in unison into coordinated operative relation, one of the carriers effective to advance the containers through the machine, and the other carrier provided with means for partially opening said containers while they are carried on the container advancing carrier, and independent means for inversely folding ends of said containers, said means for partially opening containers adjustable for different sized containers.

5. A machine for refolding different sized knock down paper containers having their opposite ends folded outwardly, having an endless carrier provided with means effective on intermediate portions of the containers to partially open them, and means independent of the carrier effective to fold said opposite ends inversely during their movement through the machine.

6. A machine for opening up knock down paper containers, including opposite carriers operable in unison, one of the carriers acting to move the containers progressively, the other provided with means for partially opening up the containers during their progressive movement and also provided with means to hold down the cartons during the time when they are being opened up.

7. A machine for opening up knock down paper containers, including opposite carriers operable in unison, one of the carriers acting to move the containers progressively, the other provided with means for partially opening up the containers during their progressive movement and also provided with means to hold down the cartons during the time when they are being opened up, and independent means timed with the progressive moving carrier to refold containers during their movement thereon.

8. A machine for opening up knock down paper containers, including opposite carriers operable in unison, one of the carriers acting to move the containers progressively, the other provided with means for partially opening up the containers during their progressive movement and also provided with means to hold down the cartons during the time when they are being opened up, and independent means timed with the progressive moving carrier to refold containers during their movement thereon, said means adjustable for various sizes of containers.

9. A machine for opening up knock down paper containers having their opposite ends folded outwardly, having a carrier effective to move the containers progressively, and a carrier provided with means for partially opening up the containers during their progressive movement, said second named carrier also having means to hold down the cartons during the interval when they are being opened up.

10. A machine for opening up knock down paper containers having their opposite ends folded outwardly, having a carrier effective to move the containers progressively, and a carrier provided with means for partially opening up the containers during their progressive movement, said second named carrier also having means to hold down the cartons during the interval when they are being opened up, said means for opening up the cartons adjustable for various sizes of cartons.

11. A machine for opening up knock down paper containers having their opposite ends folded outwardly, having a carrier effective to move the containers progressively, and a carrier provided with means for partially opening up the containers during their progressive movement, said second named carrier also having means to hold down the cartons during the interval when they are being opened up, and independent means for inversely folding said opposite ends of said containers.

12. A machine for opening up knock down paper containers having their opposite ends folded outwardly, having a carrier effective to move the containers progressively, and a carrier provided with means for partially opening up the containers during their progressive movement, said second named carrier also having means to hold down the cartons during the interval when they are being opened up, independent means for inversely folding said opposite ends of said container, and means for delivering the then fully opened container for further operations.

SAMUEL BERGSTEIN.